Feb. 11, 1958 A. J. BREZNICK 2,822,818
VALVE DEVICE
Filed Jan. 9, 1956

ALBERT J. BREZNICK,
INVENTOR.

BY *Hoslrin White*

ATTORNEY.

United States Patent Office 2,822,818
Patented Feb. 11, 1958

2,822,818

VALVE DEVICE

Albert J. Breznick, North Hollywood, Calif., assignor to Frank A. Pachmayr, Los Angeles, Calif.

Application January 9, 1956, Serial No. 557,930

3 Claims. (Cl. 137—454.6)

This invention relates generally to valve assemblies of the type in which a valve element is confined within a passage or bore for movement between a pair of ported seats closing the bore and movable in such cooperative relation with the seats as to control the flow of pressurized fluid such as air through the valve assembly. More particularly the invention concerns a novel design of such a valve assembly directed to the objective of assuring positive sealing of the movable valve against the seats to prevent leakage of pressurized fluid through the seat ports during valve operation.

Experience with valves of the type indicated has demonstrated that even under relatively low fluid pressure conditions the valve tends to leak fluid through the seat port against which the valve bears, in spite of the most careful design and assembly of the unit. It was found that slight lateral misalignment of either or both of the seats with respect to the bore within which the valve travels and of the valve with respect to the seats, tends to prevent proper positive sealing engagement of the valve against the seats such as is necessary to prevent leakage of fluid through the ports. In an effort to overcome this problem, experimentation was conducted to determine which seat materials were most capable of preventing such leakage, various plastic materials being tried with only moderate success.

The present invention represents a significant step forward in dealing with the above problem in view of the advantageous seat material finally found and the unique integration of the seats into the valve assembly, both contributing to marked success in eliminating fluid leakage through the seat ports even under relatively high fluid pressure conditions. It was found that Babbitt containing metal having a high tin content, alloyed with such other metals as copper and lead, and in particular approximately 90 percent tin, has critically those properties of softness, deformability by the valve pressure, and restorability and it has been further discovered that the design of the valve assembly must be such that the valve element may engage each seat identically upon repeated valve cycling within the valve passage. The latter requirement was satisfied by locating the valve seats positively and against displacement within the opposite ends of the manifold containing the valve passage, and in particular by pressing the valve seats within manifold counterbores so that neither seat may move relative to the valve passage or bore. As a result, the valve, preferably comprising a stainless steel ball, repeatedly identically engages and deforms the softer Babbitt metal around the ports to conform the seats with the shape of the valve element in such manner as to ensure tight valve sealing against the seats under relatively high fluid pressure.

In further reference to the relation between the hard surface valve and its relatively soft metal seat, the assurance of complete fluid-tight seals is given by the property of the Babbitt seat to conform exactly to the engaging valve surface at not excessive valve pressures, the further property and tendency of the Babbitt to restore somewhat from small deformations (unlike e. g. a lead seat) and the peripheral confinement of the seats which compels maintenance of the exact and fully sealing shape of the valve-formed seating surfaces.

Other objects of the invention include the provision of an integral valve assembly held within a valve body chamber by a retainer, and easily removable therefrom without affecting the aligned condition of the ball valve between the two seats, since the manifold and seat structure is integral. Furthermore, fluid leakage between the manifold and seats is prevented by a pair of O-ring seals engaging opposite ends of the manifolds and the projecting portions of the seats, as will be described. Finally, provision is made for desired escape of pressurized fluid through the port accommodating the valve actuating plunger, when the ball valve is held against the opposite seat, by providing clearance between the plunger and the retainer through which the plunger extends.

Other features and objects of the invention as well as the details of an illustrative embodiment will be more fully understood from the following description of the drawings, in which.

Figure 1:
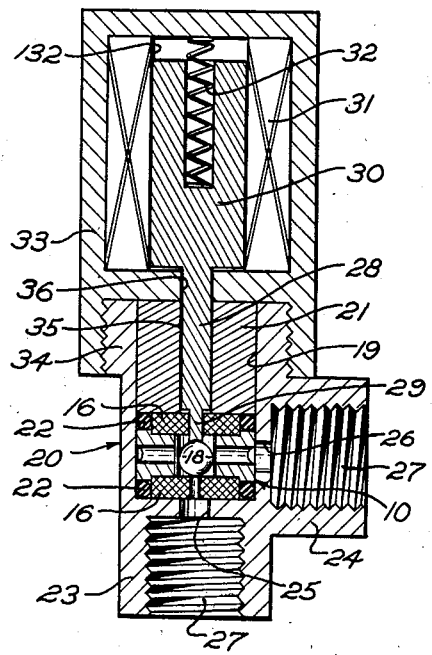
Fig. 1 is a front elevation taken in section through the complete solenoid operated valve unit.
Figure 2:
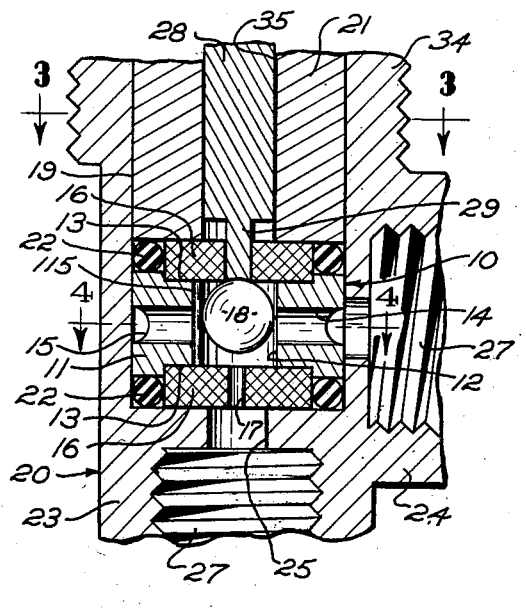
Fig. 2 is an enlarged fragmentary section showing the valve assembly and a portion of the valve body.
Figure 4:
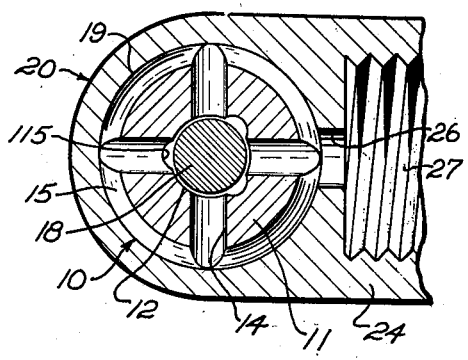
Fig. 4 is a cross-section taken on line 4—4 of Fig. 2.

The valve assembly 10 indicated in Figs. 1, 2 and 4 comprises a cylindrical manifold 11 containing an axial bore 12 communicating between concentric counterbore 13 formed in the opposite ends of the manifold, and also containing four radially extending outlets 14 communicating between the side of the bore 12 and an annular groove 15 formed about the manifold. The bore is relieved by several grooves 115 spaced about its periphery and extending axially between the counterbores 13 for purposes that will appear. A pair of disc-shaped valve seats 16 are press-fitted into the counterbores in closing relation to the bore so that the seats and the manifold form an integral structure. The seats also project outwardly from opposite ends of the manifold and contain axial ports 17 communicating with the interior of the bore at opposite ends thereof. As brought out in the introduction, the seats are formed of Babbitt metal preferably having a high tin content of around 90 percent.

Centrally located within the bore in closely fitted relation therewith is an axially movable ball valve 18 formed of a metal harder than Babbitt and preferably of stainless steel, so that when the ball is pressed against the seats the Babbitt metal around the ports will be deformed into the shape of the surface portion of the ball valve pressing thereagainst. The ball valve should be closely fitted within the bore against lateral displacement therein during its travel between the seats so that it will repeatedly identically engage the seats. This may be accomplished by reaming the bore 12 to a dimension slightly smaller than the ball valve and then forcing through the bore a ball having a uniform outer diameter approximately one-half thousandth larger than the ball valve, so that the overall ultimate clearance between the ball valve and the bore will be approximately one-half thousandth of an inch. As a result, the valve means in the bore without lateral deviation and upon engagement with either seat forms a very effective seal against leakage of pressurized fluid such as compressed air through either port 17.

The valve assembly 10 is shown in Figs. 1 and 2 received within an enlarged bore 19 formed in a T-shaped valve body 20 and opening outwardly from one arm of the body, the valve assembly being held in position at the bottom of the bore by a cylindrical retainer 21 also received within the bore 19. A pair of elastomer O-ring seals 22 are positioned about the projecting valve seats 16 in tight engagement therewith and are sized for reception within the enlarged bore 19 and for tight engagement against the opposite ends of the manifold when retainer 21 holds the valve assembly in position, the seals preventing escape of pressurized fluid between the manifold and the seats.

The opposite arm 23 and the base 24 of the T-shaped valve body 20 may contain a suitable inlet 25 and outlet 26 communicating respectively with one of the valve seat ports 17 and groove 15 in the manifold. Arm 23 and base 24 of the valve body may also contain threaded connections 27 for receiving correspondingly threaded fittings.

The ball valve 18 may be actuated by the mechanism shown in Fig. 1 including a plunger 28 slidably received within the cylindrical retainer 21 and having a reduced end portion 29 loosely received within the upper seat port 17 and projecting into the manifold bore for engagement with the valve. Plunger 28 is normally biased by a spring urged solenoid core 30 into the position shown in Fig. 1, with the end portion 29 of the plunger holding the ball valve against the lower seat 16. In this position, pressurized fluid such as air cannot enter through the lower port 17 into the manifold bore since the ball valve is held tightly against the lower seat in sealing engagement therewith. When the solenoid core 30 is retracted by the solenoid 31 to compress the spring 32, the pressure of the fluid within inlet 25 forces the ball valve away from the lower seat and against the upper seat, the plunger 28 also being carried upward by this valve movement. As a result, pressurized fluid is free to flow into the manifold bore and through valve body outlet 26, the several radial outlets 14 within the manifold providing a larger outlet flow area serving to reduce the resistance to fluid flow through the manifold and thereby to minimize pressure drop therein. Also, the grooves 115 around the bore contribute to ready flow of fluid within the bore and around the sides of the valve.

Figure 3:
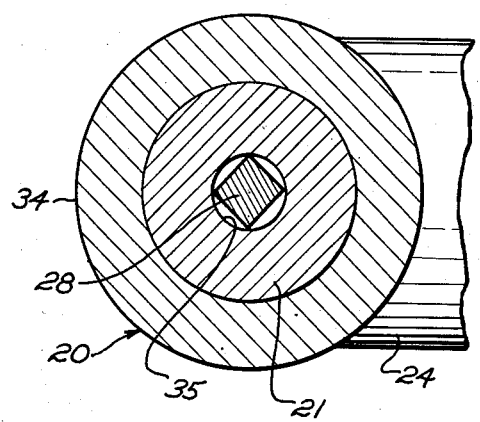
Fig. 3 is a cross-section taken on line 3—3 of Fig. 2.

Aligned co-action of the solenoid core 30 with the plunger 28 is provided by mounting the solenoid containing the core 30 within a chamber 132 in housing 33, one end of the housing being threaded onto the arm 34 of the valve body containing bore 19. Plunger 28 is formed with a square section as illustrated in Fig. 3 with the plunger corners being guided by retainer bore 35 and housing bore 36 for axial slidable movement therein. The clearances thus formed between the square plunger and the retainer bore, and between the reduced end portion 29 of the plunger and the upper port 17 provide for exhausting of pressurized fluid from within the bore 12 when the ball valve 18 is held against the lower seat.

I claim:

1. The combination, comprising a valve body containing an outwardly opening cylindrical chamber and having an inlet and outlet communicating respectively with the bottom and side of said chamber, a valve assembly removably mounted within said chamber including a cylindrical manifold containing a bore communicating between a pair of counterbores at opposite ends of the manifold and an outlet communicating between said bore and the valve body outlet, a pair of cylindrically ported Babbitt metal valve seats fitted within said counterbores against displacement therein with said ports in axial aligned communication with said bore and with one of said ports communicating with said inlet, said seats extending transversely across the bore in closing relation therewith and projecting from said recesses, and a hard metal ball valve larger than the ports centered within the bore and axially movable therein into pressing engagement with said seats about said ports to deform the engaged seat metal in accordance with the seat engaging portions of the valve adapting the valve to seal against the seats, a retainer in said chamber holding said valve assembly against the chamber bottom, and a plunger extending through the retainer and the other of said ports and movable relative thereto into and out of engagement with the valve to close the valve against the seat containing said one port for preventing fluid flow therethrough and alternately to free the valve for movement within the bore to engagement with the seat containing said other port for preventing fluid escape therethrough during fluid flow through said inlet and outlets.

2. The invention as defined in claim 1 including a pair of elastomer O-ring seals respectively extending about and engaged against the seats and opposite ends of the manifold.

3. The invention as defined in claim 1 comprising a spring biasing said plunger whereby said plunger holds said ball valve against the seat containing said one port, and an electrically energizable solenoid operative to retract said plunger away from the valve.

References Cited in the file of this patent

UNITED STATES PATENTS

| | | |
|---|---|---|
| 152,844 | Johnston | July 7, 1874 |
| 606,867 | Hoover | July 5, 1898 |
| 834,626 | Longacre | Oct. 30, 1906 |
| 899,210 | Doyle | Sept. 22, 1908 |
| 1,649,900 | Holdsworth | Nov. 22, 1927 |
| 2,595,311 | Strange | May 6, 1952 |
| 2,633,711 | Torrence | Apr. 7, 1953 |